(12) United States Patent
Gerdes et al.

(10) Patent No.: US 10,243,371 B2
(45) Date of Patent: Mar. 26, 2019

(54) SYSTEM, APPARATUS, AND METHOD FOR CONTROLLING LOAD SHARING OF GENERATOR SETS

(71) Applicant: Caterpillar Inc., Peoria, IL (US)

(72) Inventors: Josenia Y. Gerdes, Dunlap, IL (US); Perry D. Converse, Lafayette, IN (US); Isaac E. Fox, Houston, TX (US)

(73) Assignee: Caterpillar Inc., Deerfield, IL (US)

( * ) Notice: Subject to any disclaimer, the term of this patent is extended or adjusted under 35 U.S.C. 154(b) by 288 days.

(21) Appl. No.: 15/380,650

(22) Filed: Dec. 15, 2016

(65) Prior Publication Data

US 2018/0175626 A1 Jun. 21, 2018

(51) Int. Cl.
*H02J 3/46* (2006.01)
*G05F 1/66* (2006.01)

(52) U.S. Cl.
CPC . *H02J 3/46* (2013.01); *G05F 1/66* (2013.01)

(58) Field of Classification Search
CPC .... G05F 1/66; B06L 11/1851; B06L 15/2045; H02P 9/102; G05B 2219/2639
USPC ........................... 700/287, 295, 297
See application file for complete search history.

(56) References Cited

U.S. PATENT DOCUMENTS

| 7,619,324 | B2 | 11/2009 | Folken et al. | |
| 8,205,594 | B2 | 6/2012 | Fore et al. | |
| 8,358,036 | B2 | 1/2013 | Dozier et al. | |
| 8,400,001 | B2 | 3/2013 | Eaton et al. | |
| 9,059,587 | B2 | 6/2015 | Williams | |
| 2014/0103727 | A1* | 4/2014 | Taimela | H02J 3/24 307/76 |
| 2016/0149412 | A1* | 5/2016 | Itaya | H02J 3/16 307/31 |
| 2017/0070049 | A1* | 3/2017 | Laubenstein | H02J 7/0003 |

FOREIGN PATENT DOCUMENTS

WO  WO 2015/150740 A1  10/2015

* cited by examiner

*Primary Examiner* — Michael J Brown
(74) *Attorney, Agent, or Firm* — Oblon, McClelland, Maier & Neustadt

(57) ABSTRACT

A control system, apparatus, and method to control load sharing of multiple generator sets of a power supply system are described. Load transient set points to add an individual generator set can include a transient percentage threshold to characterize load transients as a load transient, a transient count threshold, and a transient count time period during which a detected number of load transients is compared with the transient count threshold. A controller can determine whether to add the individual generator set based on whether the detected number of load transients is equal to the transient count threshold within the transient count time period and control addition of the individual generator set responsive to the detected number of load transients equaling the transient count threshold.

20 Claims, 4 Drawing Sheets

SYSTEM, APPARATUS, AND METHOD FOR CONTROLLING LOAD SHARING OF GENERATOR SETS

TECHNICAL FIELD

The present disclosure relates to a power supply system, and more particularly to a system, an apparatus and a method for controlling load sharing of generator sets of the power supply system.

BACKGROUND

A generator set can be used in various industries for supplying electric power in the event of a break in electric power from the supply line or for meeting a relatively high demand of load. However, the generator set may be added to supply electric power either prematurely or with delay in response to load transient spikes. Also, after being added the generator set may be prematurely dropped from supplying power, or retained over an extended period of time.

U.S. Pat. No. 7,619,324 ("the '324 patent") describes a method of operating a power system that may include commanding a plurality of generator sets that are disconnected from the power line to start generating electricity, and supplying to a control device acting as a coordinating control unit information about the operating state of each of the plurality of generator sets commanded to start generating electricity. According to the '324 patent, the method may also include determining which of the plurality of generator sets has become ready to supply electricity to the power line first, and initiating supply of electricity to the power line by first connecting to the power line the generator set determined to be the first ready to supply electricity.

SUMMARY OF THE DISCLOSURE

In one aspect of the present disclosure, a control system to control load sharing of a plurality of generator sets of a power supply system is provided. The control system includes memory configured to store data regarding first load transient set points to add an individual generator set of the plurality of generator sets for load sharing of a load drawing power from the power supply system. The first load transient set points to add the individual generator set include a first transient percentage threshold to characterize load transients as a load transient for adding the individual generator set of the plurality of generator sets for load sharing of the load, a first transient count threshold for adding the individual generator set for load sharing of the load, and a first transient count time period during which to compare a detected number of load transients for adding the individual generator set to the first transient count threshold. The control system further includes a controller in communication with the memory. The controller is configured to determine whether to add the individual generator set for load sharing of the load based on whether the detected number of load transients for adding the individual generator set is at least equal to the first transient count threshold within the first transient count time period. The controller is further configured to control addition of the individual generator set for load sharing responsive to the detected number of load transients for adding the individual generator set equaling the first transient count threshold during the first transient count time period.

In another aspect of the present disclosure, a computer-implemented method of controlling a plurality of generator sets of a power supply system is provided. The computer-implemented method includes determining whether to bring online a generator set, of the plurality of generator sets, to provide power to a load already being provided with power by at least one other generator set of the plurality of generator sets, based on whether a detected number of load transients above a first preset magnitude is at least equal to a first transient count threshold within a first transient count time period. The computer-implemented method further includes bringing online the generator set responsive to the detected number of load transients above the first preset magnitude equaling the first transient count threshold during the first transient count time period.

In yet another aspect of the present disclosure, a power supply system is provided. The power supply system includes a plurality of generator sets electrically coupled to a load to provide electric power to the load. Each generator set is communicably coupled to each of the other generator sets via an ethernet connection. The power supply system further includes a user interface to receive a first plurality of load transient set points to add a first generator set of the plurality of generator sets to provide electric power to the load and to receive a second plurality of load transient set points to remove a second generator set of the plurality of generator sets from providing electric power to the load. The first plurality of load transient set points includes a first transient percentage threshold to characterize load transients as a load transient for adding the first generator set to provide electric power to the load, a first transient count threshold to add the first generator set to provide electric power to the load, and a first transient count time period during which to compare a detected number of load transients to add the first generator set to the first transient count threshold. The second plurality of load transient set points includes a second transient percentage threshold, less than the first transient percentage threshold, to characterize load transients as a load transient to remove the second generator set from supplying electric power to the load, a second transient count threshold to remove the second generator set from providing electric power to the load, and a second transient count time period during which to compare a detected number of load transients to remove the second generator set to the second transient count threshold. The power supply system further includes memory to store data corresponding to the first plurality of set points to add the first generator set to provide electric power to the load and to store data corresponding to the second plurality of set points to remove the second generator set from providing electric power to the load. The power supply system further includes a controller in communication with the memory and communicably coupled to each of the generator sets via the ethernet connection. The controller is configured to determine whether to add the first generator set to provide electric power to the load based on whether the detected number of load transients to add the first generator set is at least equal to the first transient count threshold within the first transient count time period. The controller is further configured to add the first generator set to provide electric power to the load responsive to the detected number of load transients to add the first generator set equaling the first transient count threshold during the first transient count time period. The controller is further configured to determine whether to remove the second generator set from providing electric power to the load based on whether the detected number of load transients to remove the second generator set is less than the second transient count threshold within the second transient count time period and whether all steady state conditions to remove the generator set are met. The controller is further configured to remove the second generator set from providing electric power to the load based on the detected number of load transients to remove the second generator set being less than the second transient count threshold at the end of the second transient count time period, and all of the steady state conditions to remove the second generator set being met. The first generator set and the second generator set are either the same generator set or different generator sets.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments of the disclosed subject matter, and, together with the description, explain various embodiments of the disclosed subject matter. Further, the accompanying drawings have not necessarily been drawn to scale, and any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
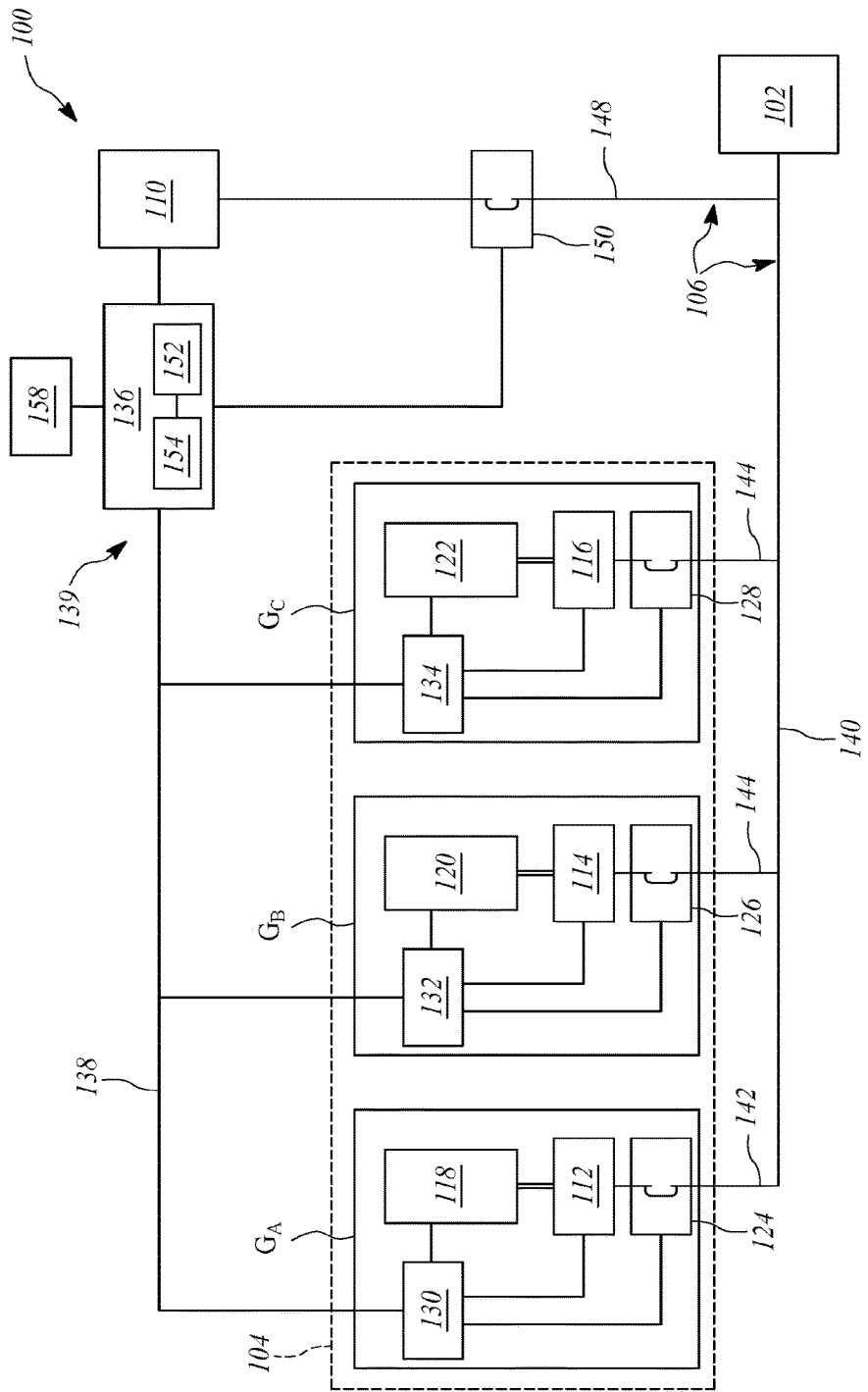
FIG. 1 is a schematic block diagram of a power supply system according to one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the disclosed subject matter involve a power supply system that implements configurable set points, which may be referred to herein as user-programmable set points, for various load transient conditions to more precisely control circumstances under which a generator set will be added for load sharing and/or circumstances under which the generator set will be removed from load sharing. The "trigger" to bring another generator set online may be based on whether a number of transients above a predetermined transient threshold reaches a preset number within a preset period of time. Generally speaking, the "trigger" to drop an added generator may be more stringent than the trigger for adding the generator set.

FIG. 1 illustrates a schematic block diagram of a power supply system 100 according to one or more embodiments of the present disclosure.

The power supply system 100 may be configured to supply electricity to an electric power load 102, which may be referred to herein as "the load 102." The power supply system 100 may include multiple power sources 104, which may be individually referred as "the generator set $G_A$," "the generator set $G_B$," and "the generator set $G_C$," operable to supply electrical power (i.e., electricity), and a power-transmission network 106 to transfer electrical power from the multiple power sources 104 to the load 102. Of course, though the power supply system 100 is illustrated with three generator sets, the power supply system 100 may include two generator sets or more than three generator sets. Furthermore, the generator sets may all be the same (e.g., same type, model, ratings, etc.), or one or more generator sets may be different. The load 102 may include any device or devices including, but not limited to, electric motors and lights, that may require electrical power to perform one or more tasks, such as generating rotary power. In some embodiments, the load 102 may require electric power in a particular form, such as three-phase alternating current. In an example, each generator set of the multiple generator sets $G_A$, $G_B$, $G_C$ may be communicably coupled to each of the other generator sets via a communication network, such as an Ethernet communication network.

The power supply system 100 may also include or be coupled to an electric utility 110. The electric utility 110 may be, for example, an electricity generation and distribution system that may supply electricity to multiple customers. The electric utility 110 may supply an alternating electric current, such as three-phase alternating current, with a frequency of 60 hertz.

Each of the generator sets $G_A$, $G_B$, $G_C$ may include any component or components operable to generate electricity. In some embodiments, the generator sets $G_A$, $G_B$, $G_C$ may include electric generators 112, 114, 116, respectively. The electric generators 112, 114, 116 may be drivingly connected to engines 118, 120, 122, respectively. Each of the engines 118, 120, 122 may be operable to produce mechanical power by combusting fuel including, but not limited to, diesel, a gasoline, and a gaseous-fuel. Further, each of the engines 118, 120, 122 may be a turbine engine or any other suitable engine.

Each of the electric generators 112, 114, 116 may be any type of device, such as an Alternating Current (AC) induction generator, a permanent-magnet generator, an AC synchronous generator, or a switched-reluctance generator, configured to receive mechanical power from the associated engines 118, 120, 122 and convert at least a portion of the mechanical power into electricity. In some embodiments, each of the electric generators 112, 114, 116 may be configured to generate three-phase AC electricity. In an example, each of the generator sets $G_A$, $G_B$, $G_C$ may have an electricity-generation capacity of less than about 5 megawatts (MW).

Each of the generator sets $G_A$, $G_B$, $G_C$ may also include various control components, such as switches 124, 126, 128, connected between an output of the electric generators 112, 114, 116, respectively, and the power-transmission network 106. In addition to the switches 124, 126, 128, the various control components of each of the generator sets $G_A$, $G_B$, $G_C$ may include one or more information-processing devices. For example, the generator set $G_A$ may include a unit control device 130, the generator set $G_B$ may include a unit control device 132, and the generator set $G_C$ may include a unit control device 134. Each of the unit control devices 130, 132, 134 may include various types of information-processing devices including, but not limited to, hardwired control circuits (not shown), microprocessors (not shown), and microcontrollers (not shown). The unit control devices 130, 132, 134 may be operatively connected to the engines 118, 120, 122, the electric generators 112, 114, 116, and the switches 124, 126, 128, respectively. Accordingly, the unit control devices 130, 132, 134 of the generator sets $G_A$, $G_B$, $G_C$ may monitor and/or control operations of the engines 118, 120, 122, the electric generators 112, 114, 116, and the switches 124, 126, 128, respectively.

The power supply system 100 may further include a control system 136 configured to control load sharing of the multiple generator sets $G_A$, $G_B$, $G_C$ of the power supply system 100. The control system 136 may be electrically coupled to each of the unit control devices 130, 132, 134 via a communications network 138. Optionally, the communication network 138 may be an Ethernet communications network. The control system 136 may further be configured to send information related to various aspects of operation of the power supply system 100 to each of the unit control devices 130, 132, 134. For example, the unit control devices 130, 132, 134 may receive information about one or more characteristics of the electricity generated by the generator sets $G_A$, $G_B$, $G_C$, respectively, such as voltage, current, phase, and/or frequency. Additionally, the unit control devices 130, 132, 134 may receive information relating to an amount of power required by the load 102. Each of the unit control devices 130, 132, 134 may also receive information, such as voltage and/or current, relating to the power-transmission network 106, voltage and/or current in one or more components of the load 102, and/or operating states of one or more devices of the load 102.

The unit control devices 130, 132, 134 may also communicate with one another over the communication network 138, as alluded to above. The communication network 138 may be a dedicated data link to transmit and receive data. In some embodiments, the communication network 138 may include, but is not limited to, a wide area network (WAN), a local area network (LAN), and an Ethernet network. In various embodiments, the communication network 138 may include a combination of two or more of the aforementioned networks and/or other suitable networks. Further, the communication network 138 may be implemented as a wired network, a wireless network, or a combination thereof. Further, data transmission may take place over the communication network 138 with a network protocol such that the data transmission may be in an encrypted format or any other secure format. In embodiments of the present disclosure, the communication network 138 may be embodied as one of Ethernet connection and Recommended Standard (RS) 45. Further, the communication network 138 may use a corresponding network protocol including, but not limited to, Multiple Genset Data Link (MGDL) and Modbus.

Accordingly, at least the unit control devices 130, 132, 134, the communication network 138, and the control system 136 may form a control network 139 to control the power supply system 100. The control network 139 may be configured to detect loss of communication within the power supply system 100. If any of the generator sets $G_A$, $G_B$, $G_C$ may be disconnected from the power supply system 100, the control network 139 may categorize the generator sets $G_A$, $G_B$, $G_C$ into at least two groups including a majority group that may be connected to the load 102 and a minority group that may be disconnected from the load 102.

It may be understood that the generator sets $G_A$, $G_B$, $G_C$ are exemplary and the generator sets $G_A$, $G_B$, $G_C$ may include components other than the engine 118, 120, 122 and the electric generators 112, 114, 116, respectively, for to produce electricity for the load 102, for instance. In some embodiments, one or more of the generator sets $G_A$, $G_B$, $G_C$ may be a fuel cell. Additionally, the generator sets $G_A$, $G_B$, $G_C$ may include other types of controls, such as hardwired control circuits, in addition to, or in place of, the unit control devices 130, 132, 134, respectively.

The power-transmission network 106 may further include various electrical components operable to transmit electrical power from the generator set $G_A$, the generator set $G_B$, and the generator set $G_C$ to the load 102. For example, the power-transmission network 106 may include a power line 140 connected to the load 102, and power lines 142, 144, 146 connected to the power line 140. The power lines 142, 144, 146 may connect to the switches 124, 126, 128, respectively, which respectively lead to the generator set $G_A$, the generator set $G_B$, and the generator set $G_C$. Accordingly, the switches 124, 126, 128 of the generator sets $G_A$, $G_B$, $G_C$ may be closed to electrically connect the output of the electric generators 112, 114, 116 to the power line 140 and the load 102 through the power lines 142, 144, 146, respectively. For supplying the electricity from the electric utility 110 to the power line 140 and the load 102, the power-transmission network 106 may also include a power line 148 that may be connected to a switch 150, which, in turn, may be connected to the electric utility 110. The control system 136 may be operatively connected to the switch 150 so that the control system 136 may control whether the switch 150 electrically connects the electric utility 110 to the power line 148.

The control system 136 may include various types of information-processing components including, but not limited to, hardwired control circuits, microcontrollers and microprocessors. In particular, the control system 136 may include memory 152. Memory 152 may include volatile or non-volatile, magnetic, semiconductor, tape, optical, removable, non-removable, or other types of computer-readable media or computer-readable storage devices. The memory 152 may be configured to store programs and/or other information that may be used to implement one or more processes or operations, such as those discussed below. According to embodiments of the disclosed subject matter, the memory 152 may be configured to store data regarding load transient set points to add an individual generator set of the multiple generator sets $G_A$, $G_B$, $G_C$ for load sharing, for instance, of a load drawing power from the power supply system 100, such as the load 102. Further, the memory 152 may also be configured to store data regarding load transient set points to remove an individual generator set of the multiple generator sets $G_A$, $G_B$, $G_C$ from the load sharing of the load. Optionally, the individual generator set for removal can be the same individual set that was added, for example, a most recently added individual generator set.

The control system 136 may further include a controller 154 in communication with the memory 152 and communicably coupled to each of the generator sets $G_A$, $G_B$, $G_C$ via the communication network 138. The controller 154 of the control system 136 may be configured to control load sharing for the multiple generator sets $G_A$, $G_B$, $G_C$. In order to control the load sharing of the generator sets $G_A$, $G_B$, $G_C$ the controller 154 may be configured to add at least one generator set, which may be referred to herein as "the individual generator set" or "the first generator set," of the multiple generator sets $G_A$, $G_B$, $G_C$, for the load sharing of the load 102 drawing power from the power supply system 100. In some embodiments, the controller 154 may be configured to remove at least one generator set, which may be referred to herein as "the individual generator set" or "the second generator set," of the multiple generator sets $G_A$, $G_B$, $G_C$ from providing the electric power to the load. The first generator set and the second generator set may be either the same generator set or different generator sets.

The controller 154 may be a logic unit using one or more of a processor and a microcontroller. The controller 154 may be implemented using integrated circuitry, discrete components, or a combination thereof. In one example, the controller 154 may be implemented via a computer device, such as a personal computer (PC), a laptop, or an integrated machine computer configured to serve functions of a computer. It will be appreciated that peripheral circuitry, such as buffers, latches, and switches may be implemented within the controller 154 or separately as desired. The controller 154 may also be configured to execute computer-executable instructions read from the memory 152, for instance.

The power supply system 100 may further include a user interface 158 through which a user may communicate with the control system 136. The user interface 158 may be configured to provide a graphical user interface (not shown) to receive user inputs. The control system 136 may control the operations of the power supply system 100 based on the user inputs. The user interface 158 may include an input unit (not shown). For example, the input unit may include, but is not limited to, a touch screen, a mouse, a keyboard, a pointing device, a motion sensor, and a voice recognizer.

According to embodiments of the present disclosure, the user interface 158 may be configured to receive as the user input a first plurality of load transient set points, from an operator, for instance, to add each individual generator set, which may be referred to herein as the "first generator set," of the multiple generator sets $G_A$, $G_B$, $G_C$, to provide the electric power to the load 102. The user interface 158 may also be configured to receive as the user input a second plurality of load transient set points to remove each individual generator set, which may be referred to herein as the second generator set, of the multiple generator sets $G_A$, $G_B$, $G_C$, from providing the electric power to the load 102. In some embodiments, each of the unit control devices 130, 132, 134 may include an operator interface through which the user may communicate with the unit control device 130, 132, 134. The user interface 158 may include a display unit (not shown) to display graphics, event log, and diagram associated with the generator sets $G_A$, $G_B$, $G_C$.

The control system 136 may connect to various other components that supply the control system 136 with information regarding operation of the power supply system 100. The control system 136 may receive information about one or more characteristics of the electricity supplied by the electric utility 110, such as voltage, current, phase, and/or frequency. The control system 136 may also receive the same or similar information regarding electricity flowing in the power-transmission network 106. Characteristics of the electricity flowing in the power-transmission network 106 may differ from the characteristics of the electricity supplied by the electric utility 110 in circumstances where the switch 150 is open. Information regarding the electricity flowing in the power-transmission network 106 and/or other information received by the control system 136 may serve as an indication to the control system 136 regarding the electric power needed or required by the load 102.

It may be understood that the control system 136 described herein may be viewed as exemplary and should not limit the scope of the present disclosure. In some embodiments, the control system 136 may include the unit control devices 130, 132, 134 for controlling the operation of the generator sets $G_A$, $G_B$, $G_C$, respectively. In some embodiments, the control system 136 may omit one or more of the unit control devices 130, 132, 134. In such embodiments, the control system 136 may perform control functions of the omitted unit control device(s) with one or more of the remaining unit control devices and/or with additional unit control devices not shown in FIG. 1. The control system 136 may also include additional components for controlling the electric power supplied through the power-transmission network 106. For example, in some embodiments, the control system 136 may include one or more switches in the power-transmission network 106 to selectively isolate groups of the generator sets $G_A$, $G_B$, $G_C$ from the load 102.

It also may be understood that the power supply system 100 described herein may be viewed as exemplary and should not limit the scope of the present disclosure. For example, the power supply system 100 may include different numbers and/or types of the power sources 104 that can supply the power to the power-transmission network 106. In some embodiments, the power supply system 100 may omit one of the generator sets $G_A$, $G_B$, $G_C$ and/or include other generator sets, in addition to the generator sets $G_A$, $G_B$, $G_C$ based on priority. However, at least one generator set from the generator sets $G_A$, $G_B$, $G_C$ may remain connected to the load 102 to meet a normal electrical power supply requirement of the load 102. The generator set always connected to the load 102 may be having a lowest priority in terms of removal from supplying electric power to the load 102. The unit control device of the generator set that may be always connected to the load 102 may be considered as a control node. The control node may assign priority to the other generator sets. The priority may be assigned based on an order of addition. A highest priority may be assigned to the generator set that may be added previously for the load sharing of the load 102. Similarly, in one example, the power supply system 100 may not have provisions for connecting the load 102 to the electric utility 110, and in another example, the power supply system 100 may have a configuration that may allow connection of either the electric utility 110 or another electric utility to the load 102.

During operation of the power supply system 100, the control system 136 may control the electric utility 110, the generator set $G_A$, the generator set $G_B$, and the generator set $G_C$ to supply electricity to the load 102 based on the user input and/or various operating conditions of the power supply system 100. In some circumstances, the control system 136 may be configured to maintain the switches 124, 126, 128 open to electrically disconnect the generator sets $G_A$, $G_B$, $G_C$ from the load 102 and simultaneously maintain the generator sets $G_A$, $G_B$, $G_C$, respectively, shut off. For example, the control system 136 may electrically disconnect the generator sets $G_A$, $G_B$, $G_C$ in circumstances when electricity is required only from the electric utility 110.

When the control system 136 electrically disconnects generator sets $G_A$, $G_B$, $G_C$ from the load 102, various events may cause the control system 136 to initiate supply of electricity from one or more of the generator sets $G_A$, $G_B$, $G_C$ to the power line 140 and the load 102. For example, if the electric utility 110 fails to supply power to meet the power needs of the load 102, the control system 136 may initiate supply of electricity from one or more of the generator sets $G_A$, $G_B$, $G_C$. Additionally, the control system 136 may initiate supply of electricity from one or more of the generator sets $G_A$, $G_B$, $G_C$ in response to a manual command from the user. Furthermore, in some circumstances, the control system 136 may execute one or more control strategies to automatically manage an amount of electric power supplied by the electric utility 110 versus an amount of electric power supplied by the generator sets $G_A$, $G_B$, $G_C$, or an amount of electric power supplied by generator sets of all generator sets available to provide electric power to the load 102 In such circumstances, the control system 136 may initiate supply of electricity from the generator sets $G_A$, $G_B$, $G_C$ in response to certain conditions relating to the amount of power supplied by the electric utility 110 (which in some cases may be zero).

Figure 2:
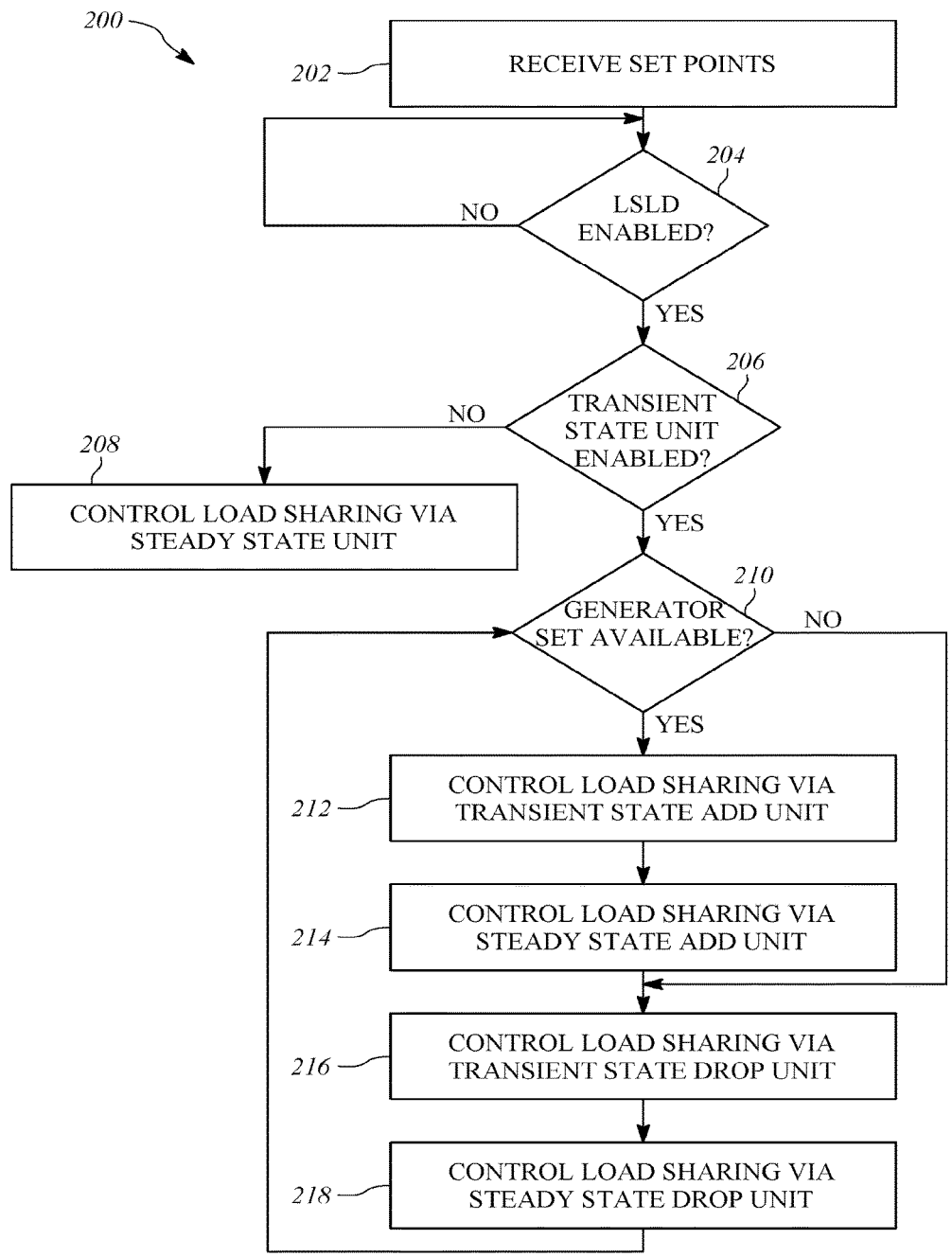
FIG. 2 is a flowchart of a method of controlling load sharing of a plurality of generator sets of a power supply system according to one or more embodiments of the present disclosure.

FIG. 2 illustrates a flowchart of a method 200 of controlling load sharing of multiple generator sets, such as the generator sets $G_A$, $G_B$, $G_C$, of a power supply, system, such as the power supply system 100, according to one or more embodiments of the present disclosure.

At step 202, the method 200 may include receiving, by the controller 154, a plurality of load transient set points, which may include a first plurality of load transient set points to add an individual generator set and/or a second plurality of load transient set points to drop or remove an individual generator set. The first load transient set points and the second load transient set points may be collectively referred to herein as "the set points." The user interface 158 may be used to input the set points. Further, the controller 154 may control load sharing by the generator sets $G_A$, $G_B$, $G_C$ of the power supply system 100 based on at least one of the first load transient set points and the second load transient set points. In some embodiments, the memory 152 of the control system 136 may be configured to store data corresponding to the first load transient set points to add the individual generator set of the multiple generator sets $G_A$, $G_B$, $G_C$ to provide electric power to the load 102. The first load transient set points to add the individual generator set may include a first transient percentage threshold to characterize load transients as a load transient for adding the individual generator set of the multiple generator sets $G_A$, $G_B$, $G_C$ for load sharing. The first load transient set points may further include a first transient count threshold for adding the individual generator set of the multiple generator sets $G_A$, $G_B$, $G_C$ for load sharing. The first load transient set points may also include a first transient count time period. During the first transient count time period, a detected number of load transients for adding the individual generator set may be compared with the first transient count threshold.

The memory 152 may also be configured to store data corresponding to the second load transient set points to remove the individual generator set of the multiple generator sets $G_A$, $G_B$, $G_C$ from providing electric power to the load 102. The second load transient set points to remove the individual generator set of the multiple generator sets $G_A$, $G_B$, $G_C$ may include a second transient percentage threshold to characterize load transients as a load transient for removing the individual generator set from the load sharing of the load 102. The second transient percentage threshold may be less than the first transient percentage threshold. The second load transient set points may further include a second transient count threshold for removing the individual generator set from load sharing of the load 102, i.e., from providing electric power to the load 102. The second load transient set points may also include a second transient count time period. During the second transient count time period, a detected number of load transients for removing the individual generator set may be compared with the second transient count threshold. In some embodiments, the second transient count threshold may be equal in value to the first transient count threshold. Further, the second transient count time period may be equal in value to the first transient count time period. In some embodiments, the first load transient set points and the second load transient set points may be stored in the memory 152 in response to user input received at the user interface 158.

At step 204, the method 200 may include determining whether a Load Sense Load Demand (LSLD) unit or operation (hereinafter "LSLD unit") of the controller 154 of the power supply system 100 is enabled. In some embodiments, the LSLD unit may be an integral module of the controller 154. Generally speaking, the LSLD unit may be configured to recognize the need of an additional generator set to be brought online in the power supply system 100 due to a condition resulting from an operation requiring an amount of electric power higher than the current operating generator sets can provide. Such condition can occur during a steady-state or a transient condition. Thus, the LSLD unit can bring online an individual generator set under certain steady-state conditions and under certain transient conditions, which will be discussed in more detail below. An example of a transient condition is a tripping operation on land drilling rigs. In one example, the transient condition may last from a couple of seconds to a few minutes. The LSLD unit may also be configured to recognize an event when an individual generator set may need to be removed from the power supply system 100 under certain steady-state conditions and under certain transient conditions. Thus, the LSLD unit may include a transient state unit or operation (hereinafter "transient state unit") and a steady state or operation (hereinafter "steady state unit"), which will be discussed in detail herein below.

If the LSLD unit is enabled, then at step 206, the method 200 may include determining whether the transient state unit of the LSLD unit is enabled. Generally speaking, the transient state unit may be defined based on a number of load transients above a threshold (e.g., a percentage threshold) occurring within a transient count time period. The number of load transients above the percentage threshold occurring within the transient count time period may be set by user input at the user interface 158. The transient state unit may be configured to bring an individual generator set online when a number of detected load transients above the threshold occur within the transient count time period. The number of load transients may be "the first transient count threshold," and the transient count time period may be "the first transient count time period." In some embodiments, the number of load transients, the threshold, and the transient count time period may be defined based on electric power required by the operation in which the power supply system 100 is implemented. In some embodiments, the LSLD unit may further include a timer to count the first transient count time period. In some embodiments, the control system 136 may include the timer. The timer to count the first transient count time period may be reset when an individual generator set of the multiple generator sets $G_A$, $G_B$, $G_C$ is added for load sharing. Further, the first transient count time period may begin upon detection of a first detected load transient above the first transient percentage threshold. In some embodiments, the LSLD unit may further include a counter corresponding to the detected number of load transients.

The steady state unit of the LSLD unit may be defined based on a steady state load threshold and a steady state predefined time duration. More specifically, the steady state unit may determine that the individual generator set may be brought online if a load is above the steady state load threshold for the steady state predefined time duration. If the load drops below the steady state load threshold within the steady state predefined time duration, a timer associated with the steady state unit may reset and the individual generator set may be brought online only when the load rises above the steady state load threshold for the steady state predefined time duration. The steady state load threshold and the steady state predefined time duration may be defined based on an application of the load 102 in which the power supply system 100 may be disposed. It may be understood that the transient state unit may trigger the addition of the individual generator set based on the number of load transients the with the first transient count time period. If the transient state unit is not enabled, then the method 200 may proceed to step 208, which may include controlling load sharing of the multiple generator sets $G_A$, $G_B$, $G_C$ of the power supply system 100 using the steady state unit.

If the transient state unit is enabled, then at step 210, the method 200 may include determining availability of at least one generator set of the multiple generator sets $G_A$, $G_B$, $G_C$ to bring online for load sharing of the load 102. The controller 154 may receive signals from the generator sets $G_A$, $G_B$, $G_C$ via communication network 138 regarding whether each generator set is available or otherwise determine whether each generator set is available.

Further, at step 212, the method 200 may include controlling load sharing by the multiple generator sets $G_A$, $G_B$, $G_C$ of the power supply system 100 by adding an individual generator set based on a transient state add unit or operation (hereinafter "transient state add unit"), when at least one generator set of the multiple generator sets $G_A$, $G_B$, $G_C$ is available to add for load sharing at step 210. Controlling load sharing of the multiple generator sets $G_A$, $G_B$, $G_C$ using the transient state add unit according to one or more embodiments of the disclosed subject matter is explained in FIG. 3. In some embodiments, the controller 154 may implement the transient state add unit for controlling addition of each individual generator set for load sharing.

Particularly, the controller 154 may determine whether to add the individual generator set for load sharing of the load 102 based on whether a detected number of load transients for adding an individual generator set is at least equal to the first transient count threshold within the first transient count time period. Further, determining whether to add the individual generator set for load sharing of the load 102 may include determining whether any generator sets of the multiple generator sets $G_A$, $G_B$, $G_C$ is available to add for the load sharing prior to determining whether the detected number of load transients for adding an individual generator set is at least equal to the first transient count threshold within the first transient count time period. Specifically, the transient state add unit may allow a condition where the multiple generator sets $G_A$, $G_B$, $G_C$ can brought online separately to share the load 102 and remain online during the transient state conditions. Further, the controller 154 may control addition of each individual generator set of the multiple generator sets $G_A$, $G_B$, $G_C$ for load sharing responsive to the detected number of load transients for adding the individual generator set equaling the first transient count threshold during the first transient count time period. That is, an individual generator set may be brought online when the detected number of load transients for adding the individual generator set equaling the first transient count threshold even if the first transient count period has not expired. Further, the addition of the individual generator set for load sharing may occur only when the controller 154 may determine that at least one generator set of the multiple generator sets $G_A$, $G_B$, $G_C$ may be available to add for load sharing. It may be noted that the individual generator set may be brought online as soon as the detected number of the load transients becomes equal to the first transient count threshold within the first transient count time period.

The controller 154 may further control addition of the generator sets for load sharing such that only one generator set is added at a time, that is, for each first transient count time period, where such first transient count time period may be reset when an individual generator set is brought online. The added generator set may have a next priority relative to any other generator set of the multiple generator sets $G_A$, $G_B$, $G_C$ in the power supply system 100 available to add for load sharing. In some embodiments, the counter corresponding to the detected number of load transients for adding the individual generator set and the timer corresponding to the first transient count time period may be reset when the controller 154 adds the individual generator set for load sharing. The timer and the counter that are reset may be further used for counting subsequent first transient time periods and the detected number of load transients within the subsequent first transient time periods, respectively, to determine whether to add another individual generator set of the multiple generator sets $G_A$, $G_B$, $G_C$.

At step 214, the method 200 may include controlling addition of the individual generator set responsive to a detected load requirement using a steady state add unit of the steady state unit. In one or more embodiments, add control at step 214 may be the same as or similar to add control at step 208, though step 214 may be performed in conjunction with the transient state add unit. In some embodiments, the controller 154 may be configured to add the individual generator set for load sharing if all steady state conditions for adding the individual generator set are met, even if the detected number of load transients for adding the individual generator set are less than the first transient count threshold during the first transient count time period. That is, step 214 can add an individual generator is steady state load requirements are met but transient state load conditions for adding are not met.

The method 200 may include optional step 216 of controlling load sharing by removing an individual generator set. A transient state drop unit of the transient state unit may be implemented to control the removal of the individual generator set. The controller 154 may determine whether to remove the individual generator set from load sharing of the load 102 based on a first condition and a second condition. In the first condition, the detected number of load transients may be less than the second transient count threshold within the second transient count time period for removing the individual generator set. In the second condition, all steady state conditions for removing the individual generator set must be met. The steady state conditions for removing the individual generator set may include at least one of steady state drop thresholds and time delays, one or more redundancy strategies, and removal of the individual generator set does not increase the load above a steady state add threshold. The controller 154 may further determine whether the first condition and the second condition may be met. When the first condition and the second conditions may be met, the controller 154 may remove an individual generator set from load sharing.

At step 218, the method 200 may include controlling removal of the individual generator set for the load sharing using a steady state drop unit of the steady state unit. In one or more embodiments, drop control at step 218 may be the same as drop control at step 208, though step 218 may be performed in conjunction with the transient state drop unit.

Figure 3:
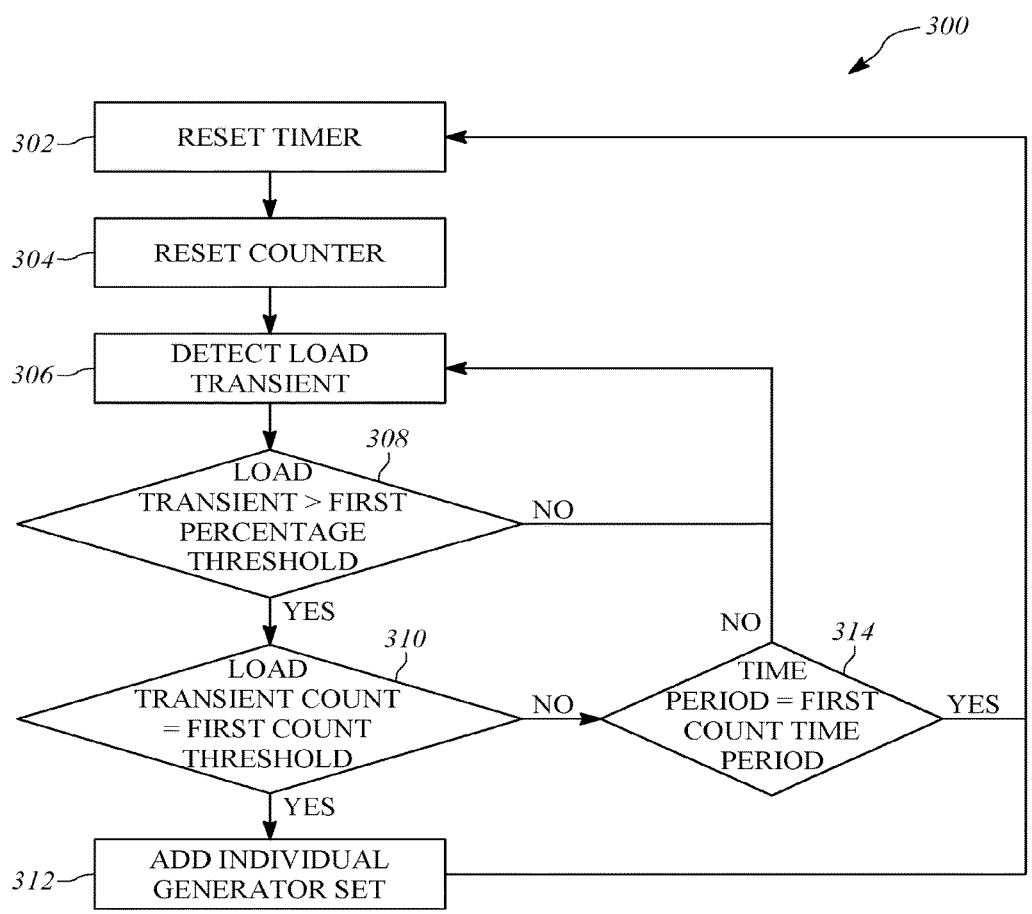
FIG. 3 is a flowchart of a method of adding an individual generator set of the plurality of generator sets for the load sharing based on a plurality of load transient set points, according to one or more embodiments of the present disclosure.

FIG. 3 illustrates a flow chart of a method 300 of adding an individual generator set for load sharing of the load 102 based on the first plurality of load transient set points, according to one or more embodiments of the present disclosure. In the present embodiment, the method 300 may be implemented using the transient state add unit, which may be a module of or performed by the controller 154. Specifically, the method 300 may be implemented to detect a number of load transients over the first transient count time period to determine whether to add an individual generator set for load sharing of the load 102.

At step 302, the method 300 may include resetting the timer of the LSLD unit to a start value. In an example, the timer may be reset to the start value, such as a time t=0, and may be configured to stop after the first transient count time period, such as a time t=T. The first transient count time period may be the duration for which the controller 154 may detect the number of load transients meeting a predetermined threshold value.

At step 304, the method 300 may include resetting the counter of the LSLD unit to an initial value, for example zero. The counter may be configured to count the number of load transients detected during the first transient count time period, i.e., t=T. In an example, a load transient above the first transient percentage threshold may be counted as one load transient. The first transient percentage threshold may be defined by the user based on the application of the power supply system 100 and power demand from the power supply system 100 to meet the load 102.

At step 306, the method 300 may include detecting a load transient. A sudden rate of change of load above a normal requirement of the load for the operation, where the power supply system 100 may be disposed within a unit time may be defined as the load transient. In one example, the unit time may be one second. When the load starts increasing, a timer having duration of one second may be initiated. Further, the controller 154 may determine at least a first condition and a second condition. The first condition may include determining whether the start of increase in load till a peak occurs within one second. The second condition may include determining whether the rate of change is greater than 5% from start to the peak. If the first condition and the second conditions are met, then the change in load may be treated as a transient. Of course, the transient may also have to exceed the first transient percentage threshold as a condition to be treated as a "qualifying" load transient for adding an individual generator set.

At step 308, the method 300 may include detecting whether a load transient is above the first transient percentage threshold, otherwise referred as "the first percentage threshold." In an example, the first transient percentage threshold may be set as 80%, the first transient count threshold may be set as 5, and the first transient count time period may be set as 10 minutes. In such cases, percentage of the load transients rises above the first transient percentage threshold, i.e., 80%, may be monitored during the first transient count time period, i.e., 10 minutes. If the controller 154 can detect that a percentage of a load transient, at any time within the first transient count time period, is greater than the first transient percentage threshold, then the count of the load transient may be incremented by 1. In order to detect the percentage of the detected load transient, a magnitude of the load transient, in terms of percentage, may be detected by the controller 154. Upon detection of the first transient load over the first transient threshold percentage, the timer may be configured to start counting the first transient count time period. If the percentage of load transient is determined to be less than the first transient percentage threshold, the controller 154 may continue to detect the load transients.

At step 310, the method 300 may further include determining whether the detected number, otherwise referred as count, of load transients is equal to the first transient count threshold, which may be referred to herein as "the first count threshold," i.e., 5, within the first transient count time period, i.e., 10 minutes. If the count of the detected load transient is equal to the first transient count threshold, then at step 312, the method 300 may include adding the individual generator set of the multiple generator sets $G_A$, $G_B$, $G_C$ for the load sharing of the load 102. Simultaneously, the timer and the counter may be reset to the start value and the initial value, respectively. Further, if the count of the detected load transients is less than the first transient threshold count within the first transient count time period, then, at step 314, the method 300 may include monitoring the transient condition till the end of the first transient count time period, which may be referred to herein as "the first count time period." Specifically, the timer may be configured to count the first transient count time period, i.e., 10 minutes, and may be reset to the initial value.

In some embodiments, even after adding the individual generator set, the added generator set may not be able to take the power demand from the load 102. In such cases, the controller 154 may be further configured to repeat the process of counting the detected load transients within the first transient count time period. If the count of the detected load transients is still greater than the first transient count threshold, then the controller 154 may further add another generator set of the multiple generator sets $G_A$, $G_B$, $G_C$. This process of adding the generator set for load sharing of the load 102 may be continued till the transient condition may be rectified during the supply of power to the load 102 from the power supply system 100. The user may configure the first transient percentage threshold, the first transient count threshold, and the first transient count time period such that and adapt the control system 136 may be configured to one of relatively fast-acting for transient conditions or relatively slow-acting for transient conditions.

It may be understood that the controller 154 may add only one generator set at a time for load sharing of the load 102. However, the generator sets may be added individually and sequentially for the load sharing in a new time window of the first transient count time period. Further, if there are no generator sets available for the load sharing, then the controller 154 may not add the generator set. In such cases, the controller 154 may add only the generator sets that may be considered "available" for the load sharing. In an example, the term "available" represents availability of the generator set in auto mode, which can be automatically added for the load sharing.

Figure 4:
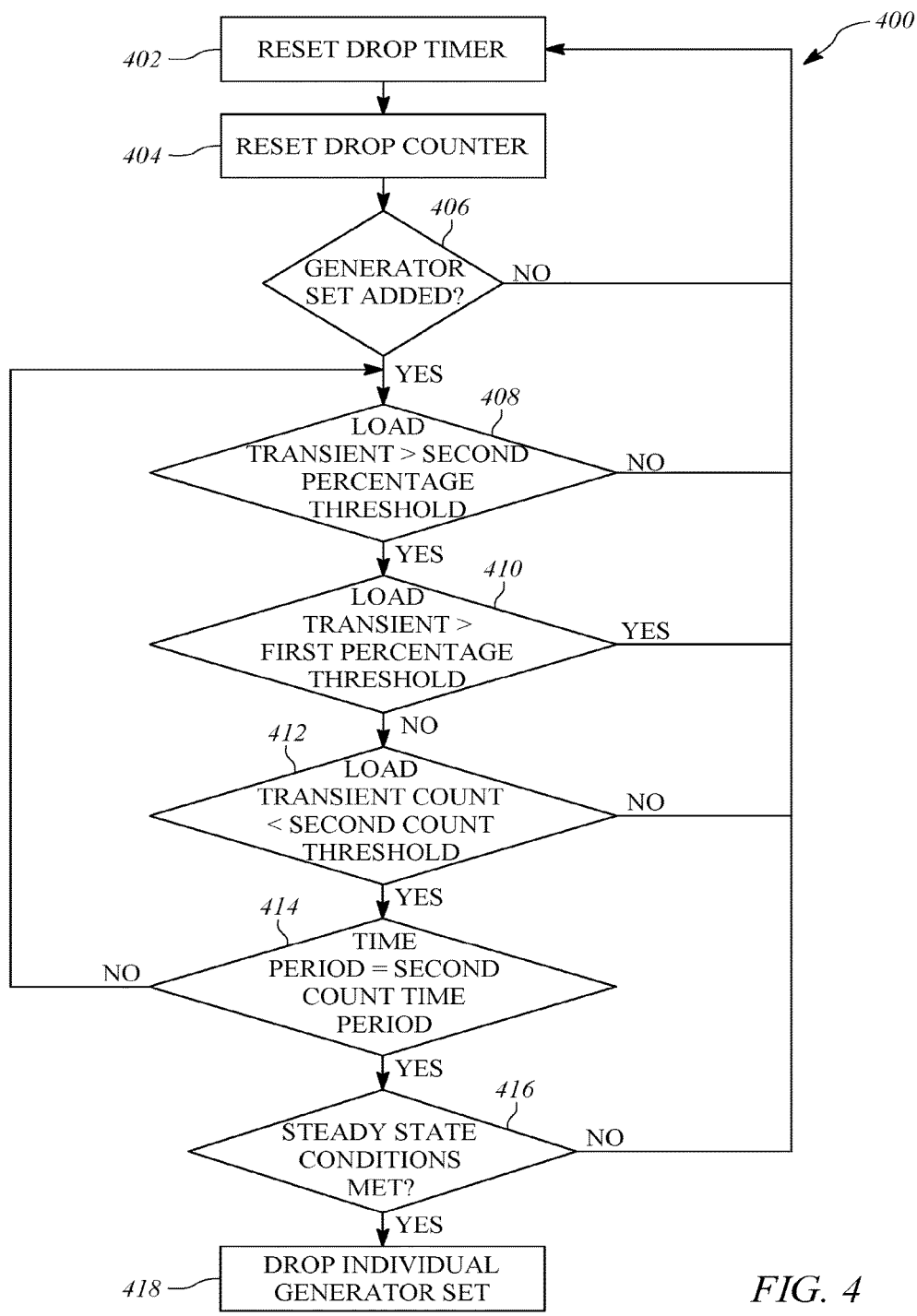
FIG. 4 is a flowchart of a method of removing an individual generator set of the plurality of generator sets from the load sharing based on a plurality of load transient set points, according to one or more embodiments of the present disclosure.

FIG. 4 illustrates a flow chart of a method 400 of removing the individual generator set from the load sharing based on the second plurality of load transient set points according to one or more embodiments of the present disclosure.

In the present embodiment, the method 400 may be implemented by the transient state drop unit, which may be a module of or performed by the controller 154. Specifically, the method 400 may be implemented to determine whether to remove an individual generator set from load sharing and to control removal of the individual generator set from load sharing using the transient state drop unit.

At step 402, the method 400 may include resetting a drop timer associated with the transient state drop unit to a start value. In some embodiments, the drop timer may be reset to the start value, such as a time t=0, and may expire at the second transient count time period, such as a time t=T. In one embodiment, the first transient count time period and the second transient count time period may be identical, i.e., t=T. The second transient count time period may be time duration required to determine whether the detected number of load transients is less than the second transient count threshold.

At step 404, the method 400 may include resetting a drop counter of the transient state drop unit to an initial value, for example zero. The drop counter may be configured to count the number of load transients detected over the second transient count time period, i.e., t=T. In an example, a load transient above the second transient percentage threshold may be counted as 1 load transient. Similarly, multiples of such load transients may occur in the second transient count time period. The second transient percentage threshold may be defined by the user based on the application of the power supply system 100 and the power demand from the power supply system 100 to meet the load 102. In the present embodiment, the second transient percentage threshold may be less than the first transient percentage threshold.

At step 406, the method 400 may include determining whether any individual generator set may be added for load sharing by the transient state add unit. If the individual generator may be added for load sharing, then the drop timer associated with the transient drop unit may be turned ON. In some embodiments, the drop timer may be activated simultaneously with the addition of the individual generator set.

Further, at step 408, the method 400 may include determining whether the load transient is above the second transient percentage threshold, otherwise referred as "the second percentage threshold." For each load transient occurring within the second transient count time period, magnitude of the load transient may be determined to detect whether the load transient may be greater than the second transient percentage threshold. If the magnitude of the detected load transient may be greater than the second transient percentage threshold, then the drop counter may start counting the load transients above the second transient percentage threshold until the count reaches the second transient count threshold.

At step 410, the method 400 may include determining whether the load transient is greater than the first transient percentage threshold, when the load transient may be above the second transient percentage threshold. If the load transient is determined to be greater than the first transient percentage threshold, then the drop timer and the drop counter may be reset.

If the load transient is less than the first transient percentage threshold, then at step 412, the method 400 may include determining whether the detected number of load transients is less than the second transient count threshold, which may be referred to herein as "the second count threshold." If the detected number of load transients is greater or equal to the second transient count threshold, then the method 400 may include resetting the drop timer and the drop counter. If the detected number of load transients is less than the second transient count threshold, then control transfers to step 414.

At the step 414, the method 400 may include determining whether the drop timer may be expired. If the drop timer is not expired, then the drop counter may continue counting the number of load transients that may be above the second transient percentage threshold. Specifically, as long as the load does not increase above the first transient percentage threshold, the drop counter may count the detected load transients. For dropping the individual generator set, the second transient count time period may be observed till the expiry of second transient count time period to determine whether the number of the load transients is less than the second transient count threshold.

If the drop timer expires at the second transient count time period, which may be referred to herein as "the second count time period," then at step 416, the method 400 may include determining whether the steady state drop conditions and the time delay associated with the steady state drop conditions are met. The steady state drop conditions may include, but are not limited to, steady state drop thresholds and time delays, one or more redundant strategies, and removal of the individual generator set does not increase the load above the steady state add threshold. In some embodiments, the method 400 may also include determining a redundancy requirement set by the user. The redundancy requirement may refer to number of generator sets that may need to be mandatorily online for the power supply system 100 to provide the power to the load 102. For example, if the power supply system 100 has 2 generator sets as redundancy requirement, then dropping one generator set from the 2 redundant generator sets may not be allowed. Also, the method 400 may further include determining whether dropping of the generator set increases the load above the first transient percentage threshold.

If the drop timer expires and the number of load transients is less than the second transient count threshold, then the transient state drop conditions are met. However, if the aforementioned steady state drop conditions are not met, then the communication network 138 deactivates a "Transient Drop inhibit" message and proceeds with checking the set of conditions discussed at step 416. If the steady state drop conditions are met and the load rises above the first transient percentage threshold while checking the steady state conditions, then the drop timer may reset and the communication network 138 may activate the "Transient Drop inhibit" message. Further, the drop timer may restart when the load drops below the first transient count threshold.

If the drop timer expires, the number of load transients is less than the second transient count threshold, and the set of conditions discussed at 416 are met, then all the conditions for dropping the individual generator set are met. In such a scenario, at step 418, the method 400 may include dropping the generator set in priority and resetting the drop timer. For example, when the individual generator set is added for load sharing, the number of load transients occurring after the addition of the individual generator may be monitored. If the number of load transients set is less than the second transient count threshold, within the second transient count time period, then the added individual generator set may be dropped from load sharing.

INDUSTRIAL APPLICABILITY

The present disclosure relates to the power supply system 100, and the control system 136 to control load sharing of the multiple generator sets $G_A$, $G_B$, $G_C$ of the power supply system 100. The control system 136 may be implemented in any power driven operations having frequent transient conditions in industries, such as mining, and oil and gas. The control system 136 may also be configured to control the load sharing of the generator sets $G_A$, $G_B$, $G_C$ based on the first load transient set points and the second load transient set points as discussed above, for instance. Controlling load sharing of the generator sets $G_A$, $G_B$, $G_C$ may include adding an individual generator set and/or removing an individual generator set of the generator sets $G_A$, $G_B$, $G_C$. The first load transient set points and the second load transient set points may be configured by the user for respectively adding and removing the individual generator set and hence to control load sharing of the load 102. Accordingly, the first load transient set points and the second load transient set points may be configured based on the operation in which the power supply system 100 may be disposed. Controlling load sharing by the control system 136 may prevent premature adding of a generator set for load sharing. Further, controlling load sharing by the control system 136 may prevent delayed adding of a generator set for the load sharing. Further, premature dropping of the generator set from load sharing may be prevented or reduced in frequency.

The present disclosure may also provide a computer-implemented method of controlling the generator sets $G_A$, $G_B$, $G_C$ of the power supply system 100. The computer-implemented method may include determining whether to bring online a generator set, of multiple generator sets $G_A$, $G_B$, $G_C$. The generator set may be brought online to provide electric power to a load already being provided with power by at least one other generator set of the multiple generator sets $G_A$, $G_B$, $G_C$. The generator set may be brought online based on the detected number of load transients that may be greater than the first transient percentage threshold, wherein may be referred to herein as "the first preset magnitude." Specifically, the method may determine whether the detected number of load transients having a magnitude greater than the first preset magnitude is at least equal to the first transient count threshold within the first transient count time period. When the detected number of load transients above the first preset magnitude is equal to the first transient count threshold during the first transient count time period, the computer-implemented method may include bringing online the generator set for load sharing. In some embodiments, the generator set may be brought online if all steady state conditions for bringing online the generator set are met, even if the detected number of load transients above the first preset magnitude may be below the first transient count threshold during the first transient count time period.

The computer implemented method may further include determining whether to take offline a generator set based on the detected number of load transients above the second transient percentage threshold, which may be referred to herein as "the second preset magnitude." Specifically, the method may determine whether the detected number of load transients above the second preset magnitude is less than the second transient count threshold within the second transient count time period. Further, the computer-implemented method may further include taking offline the generator set when the detected number of load transients is less than the second transient count threshold. It may be understood that in one or more embodiments of the disclosed subject matter, taking the generator set offline can occur only when the detected number of load transients is less than the second transient count threshold and all steady state conditions to take the generator set offline are met.

The computer-implemented method may further include receiving signals corresponding to user input from the user interface 158 to reconfigure the set points including, but not limited to, the first preset magnitude, the first transient count threshold, and the first transient count time period. The computer-implemented method may further include storing the reconfigurable set points corresponding to the first preset magnitude, the first transient count threshold, and the first transient count time period in the memory 152.

The power supply system 100 may include at least one generator set to always provide the power to the load 102 regardless of the load transient conditions. The unit control device of such generator set may remain in run mode throughout the operation of the power supply system 100. The generator set can thus remain online may not be dropped from load sharing. Although the control system 136 may control load sharing of the multiple generator sets $G_A$, $G_B$, $G_C$ of the power supply system 100, the unit control device 130, 132, 134 of the generator sets $G_A$, $G_B$, $G_C$, respectively, may be used to control load sharing of the generator sets $G_A$, $G_B$, $G_C$ of the power supply system 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system to control load sharing of a plurality of generator sets of a power supply system, the control system comprising:
   memory configured to store data regarding first load transient set points to add an individual generator set of the plurality of generator sets for load sharing of a load drawing power from the power supply system, the first load transient set points to add the individual generator set including:
    a first transient percentage threshold to characterize load transients as a load transient for adding the individual generator set of the plurality of generator sets for load sharing of the load,
    a first transient count threshold for adding the individual generator set for load sharing of the load, and
    a first transient count time period during which to compare a detected number of load transients for adding the individual generator set to the first transient count threshold; and
a controller in communication with the memory, the controller configured to:
    determine whether to add the individual generator set for load sharing of the load based on whether the detected number of load transients for adding the individual generator set is at least equal to the first transient count threshold within the first transient count time period, and
    control addition of the individual generator set for load sharing responsive to the detected number of load transients for adding the individual generator set equaling the first transient count threshold during the first transient count time period.

2. The control system of claim 1,
wherein the memory is configured to store data regarding second load transient set points to remove the individual generator set of the plurality of generator sets from load sharing of the load,
wherein the second load transient set points to remove the individual generator set include:
    a second transient percentage threshold, less than the first transient percentage threshold, to characterize load transients as a load transient for removing the individual generator set from load sharing of the load,
    a second transient count threshold for removing the individual generator set from load sharing of the load, and
    a second transient count time period during which to compare a detected number of load transients for removing the individual generator set to the second transient count threshold, and
wherein the controller is configured to:
    determine whether to remove the individual generator set from load sharing of the load based on whether the detected number of load transients for removing the individual generator set is less than the second transient count threshold within the second transient count time period and whether all steady state conditions for removing the individual generator set are met, and
    control removal of the individual generator set from load sharing based on the detected number of load transients for removing the individual generator set being less than the second transient count threshold at the end of the second transient count time period, and all of the steady state conditions for removing the individual generator set being met.

3. The control system of claim 2, wherein the second transient count threshold is equal in value to the first transient count threshold and/or the second transient count time period is equal in value to the first transient count time period.

4. The control system of claim 2, wherein the steady state conditions include:
    steady state drop thresholds and time delays,
    one or more redundant strategies, and
    removing the individual generator set does not increase the load above a steady state add threshold.

5. The control system of claim 1,
wherein the determining whether to add the individual generator set for load sharing of the load includes determining whether any generator sets of the plurality of generator sets are available to add for load sharing, and
wherein the controlling addition of the individual generator set for load sharing occurs only when the controller determines that at least one generator sets of the plurality of generator sets is available to add for load sharing.

6. The control system of claim 1, wherein the controller controls addition of the individual generator set for load sharing such that only one generator set, the individual generator set, is added.

7. The control system of claim 1, wherein a timer to count the first transient count time period begins upon detection of a first detected load transient for adding the individual generator set after reset of the timer to count the first transient count time period.

8. The control system of claim 1, wherein a counter corresponding to the detected number of load transients for adding the individual generator set and a timer corresponding to the first transient count time period are reset when the controller adds the individual generator set for load sharing.

9. The control system of claim 1, wherein the added individual generator set has a next priority relative to any other generator set, of the generator sets, available to add for load sharing.

10. The control system of claim 1, wherein the controller is configured to add the individual generator set for load sharing if all steady state conditions for adding the individual generator set are met, even if the detected number of load transients for adding the individual generator set do not equal the first transient count threshold during the first transient count time period.

11. The control system of claim 1, wherein the first load transient set points are stored in the memory responsive to a user input at a user interface.

12. A computer-implemented method of controlling a plurality of generator sets of a power supply system, the computer-implemented method comprising:
    determining whether to bring online a generator set, of the plurality of generator sets, to provide power to a load already being provided with power by at least one other generator set of the plurality of generator sets, based on whether a detected number of load transients above a first preset magnitude is at least equal to a first transient count threshold within a first transient count time period; and
    bringing online the generator set responsive to the detected number of load transients above the first preset magnitude equaling the first transient count threshold during the first transient count time period.

13. The computer-implemented method of claim 12, wherein the preset magnitude, the first transient count threshold, and the first transient count time period are reconfigurable set points for bring online the generator set.

14. The computer-implemented method of claim 12, further comprising:

determining whether to take offline the generator set based on whether a detected number of load transients above a second preset magnitude is less than a second transient count threshold within a second transient count time period; and taking offline the generator set based on the detected number of load transients being less than the second transient count threshold.

15. The computer-implemented method of claim 14, wherein the taking the generator set offline occurs only when the detected number of load transients is less than the second transient count threshold and all steady state conditions to take the generator set offline are met.

16. The computer-implemented method of claim 15, wherein the steady state conditions include:
   steady state drop thresholds and time delays,
   one or more redundant strategies, and
   removing the individual generator set does not increase the load above a steady state add threshold.

17. The computer-implemented method of claim 12, further comprising receiving signals from a user interface to store in memory reconfigurable set points corresponding to the first preset magnitude, the first transient count threshold, and the first transient count time period.

18. The computer-implemented method of claim 12, further comprising bringing online the generator set if all steady state conditions for bringing online the generator set are met, even if the detected number of load transients above the first preset magnitude are below the first transient count threshold during the first transient count time period.

19. The computer-implemented method of claim 12, further comprising resetting a counter corresponding to the detected number of load transients above the first preset magnitude and a timer corresponding to the first transient count time period are reset after bringing online the generator set.

20. A power supply system comprising:
   a plurality of generator sets electrically coupled to a load to provide electric power to the load, each generator set being communicably coupled to each of the other generator sets via an ethernet connection;
   a user interface to receive a first plurality of load transient set points to add a first generator set of the plurality of generator sets to provide electric power to the load and to receive a second plurality of load transient set points to remove a second generator set of the plurality of generator sets from providing electric power to the load,
   the first plurality of load transient set points including:
      a first transient percentage threshold to characterize load transients as a load transient for adding the first generator set to provide electric power to the load,
      a first transient count threshold to add the first generator set to provide electric power to the load, and
      a first transient count time period during which to compare a detected number of load transients to add the first generator set to the first transient count threshold, and
   the second plurality of load transient set points including:
      a second transient percentage threshold, less than the first transient percentage threshold, to characterize load transients as a load transient to remove the second generator set from supplying electric power to the load,
      a second transient count threshold to remove the second generator set from providing electric power to the load, and
      a second transient count time period during which to compare a detected number of load transients to remove the second generator set to the second transient count threshold;
   memory to store data corresponding to the first plurality of load transient set points to add the first generator set to provide electric power to the load and to store data corresponding to the second plurality of load transient set points to remove the second generator set from providing electric power to the load; and
   a controller in communication with the memory and communicably coupled to each of the generator sets via the ethernet connection, the controller configured to:
      determine whether to add the first generator set to provide electric power to the load based on whether the detected number of load transients to add the first generator set is at least equal to the first transient count threshold within the first transient count time period,
      add the first generator set to provide electric power to the load responsive to the detected number of load transients to add the first generator set equaling the first transient count threshold during the first transient count time period,
      determine whether to remove the second generator set from providing electric power to the load based on whether the detected number of load transients to remove the second generator set is less than the second transient count threshold within the second transient count time period and whether all steady state conditions to remove the generator set are met, and
      remove the second generator set from providing electric power to the load based on the detected number of load transients to remove the second generator set being less than the second transient count threshold at the end of the second transient count time period, and all of the steady state conditions to remove the second generator set being met,
   wherein the first generator set and the second generator set are either the same generator set or different generator sets.

* * * * *